United States Patent [19]

Savariar

[11] Patent Number: 5,239,043
[45] Date of Patent: Aug. 24, 1993

[54] PROCESS FOR PREPARATION OF POLY(ARYL ETHER) POLYMERS BY MACRO BICYCLIC CATALYSTS

[75] Inventor: Selvaraj Savariar, Duluth, Ga.

[73] Assignee: Amoco Corporation, Chicago, Ill.

[21] Appl. No.: 815,239

[22] Filed: Dec. 31, 1991

[51] Int. Cl.$^5$ .................. C08G 8/02; C08G 14/00; C08G 65/40

[52] U.S. Cl. .................. 528/125; 528/126; 528/128; 528/171; 528/174; 528/175; 528/211; 528/214; 528/216; 528/217; 528/218; 528/219; 528/220

[58] Field of Search .............. 528/125, 126, 128, 175, 528/174, 171, 219, 211, 218, 214, 216, 217, 220

[56] References Cited

U.S. PATENT DOCUMENTS

| | | | |
|---|---|---|---|
| 3,065,205 | 11/1962 | Bonner | 528/180 |
| 3,264,536 | 8/1966 | Robinson | 528/125 |
| 3,941,748 | 3/1976 | King | 528/125 |
| 3,966,766 | 6/1976 | Lehn | 317/258 |
| 4,108,837 | 8/1978 | Johnson | 528/126 |
| 4,156,683 | 5/1979 | Lehn . | |
| 4,169,178 | 9/1979 | Freeman | 528/126 |
| 4,175,175 | 11/1979 | Johnson | 528/125 |
| 4,176,222 | 11/1979 | Cinderey | 528/125 |
| 4,256,859 | 3/1981 | Woo | 549/351 |
| 4,273,712 | 6/1981 | Williams, III | 562/468 |
| 4,287,125 | 9/1981 | Soula | 549/451 |
| 4,320,224 | 3/1982 | Rose | 528/126 |
| 4,343,745 | 8/1982 | Soula | 556/1 |
| 4,362,857 | 12/1982 | Yonezawa | 528/174 |
| 4,447,585 | 5/1984 | Parker | 525/385 |
| 4,460,778 | 7/1984 | Brunelle | 546/304 |
| 4,474,963 | 10/1984 | Gokel | 549/353 |
| 4,478,983 | 10/1984 | Parker | 525/385 |
| 4,544,710 | 10/1985 | Parker | 525/385 |
| 4,595,760 | 6/1986 | Brunelle | 546/256 |
| 4,611,033 | 9/1986 | Maresca | 528/486 |
| 4,638,044 | 1/1987 | Kelsey | 528/125 |
| 4,656,295 | 4/1987 | Gamon | 549/352 |
| 4,681,949 | 7/1987 | Brunelle | 548/461 |

FOREIGN PATENT DOCUMENTS 847963  7/1970  Canada .

Primary Examiner—John Kight, III
Assistant Examiner—P. Hampton-Hightower
Attorney, Agent, or Firm—Richard J. Schlott; Stephen L. Hensley; Frank J. Sroka

[57] ABSTRACT

An improved process for the preparation of poly(aryl ether) polymers by reacting, in the absence of dipolar aprotic solvents, an alkali metal double salt of a dihydric phenol with a dihalobenzenoid compound in the presence of a macro bicyclic compound having nitrogen bridgehead atoms linked together by three hydrocarbon bridging chains having in each of the hydrocarbon bridging chains at least one additional hetro atom selected from the group consisting of oxygen, nitrogen and sulfur atoms.

The poly(aryl ether) polymer resins produced by the process have a low degree of coloration and excellent mechanical and electrical properties which allow them to be molded into a variety of articles.

31 Claims, No Drawings

PROCESS FOR PREPARATION OF POLY(ARYL ETHER) POLYMERS BY MACRO BICYCLIC CATALYSTS

FIELD OF THE INVENTION

This invention relates to an improved process for preparation of poly(aryl ether) polymers by reaction of alkali salts of phenols with halides using preselected bicyclic macrocyclic compounds as catalyst, but without a polar aprotic solvent. More particularly, this invention relates to reacting an alkali metal double salt of a dihydric phenol with a dihalobenzenoid compound in the presence of a macro bicyclic compound having nitrogen bridgehead atoms linked together by three hydrocarbon bridging chains having in each of the hydrocarbon bridging chains at least one additional hetro atom selected from the group consisting of oxygen, nitrogen and sulfur atoms. The polymerization proceeds at temperatures in a range upward from about 100° C. and below the decomposition temperatures of the polymer formed, the reactants, the catalyst, and the polymerization solvent, if any, employed.

The poly(aryl ether) polymer resins produced by the process of this invention are tough, rigid, high mechanical strength thermoplastics which maintain their properties over a wide temperature range of from $-100°$ C. to above 150° C. They have a low degree of coloration. They are hydrolytically stable and excellent in properties which allow them to be molded into a variety of articles.

BACKGROUND OF THE INVENTION

Poly(aryl ether) polymer resins comprise ether groups linking together various functional groups and aromatic radicals, such as phenylene, substituted phenylene, biphenylene, naphthylene.

Over the years, there has been developed a substantial body of patent and other literature directed to the formation and properties of poly(aryl ether) polymers. Processes for the preparation of poly(aryl ether) polymers may be divided into two general classes by method of reaction employed: the electrophilic aromatic substitution method and the nucleophilic aromatic substitution method.

Some of the earliest work, such as by Bonner, U.S. Pat. No. 3,065,205, involves the electrophilic aromatic substitution (viz. Friedel-Crafts-catalyzed) reaction of aromatic diacylhalides with unsubstituted aromatic compounds, such as diphenyl ether. In accordance with this method, polymerization proceeds with liberation of hydrogen halide by a Friedel-Crafts-catalyzed reaction in which an aromatic ring hydrogen is substituted with a cationic species derived from the corresponding acyl halide by use of a Lewis acid catalyst such as aluminum chloride, boron trifluoride or hydrogen fluoride. As is easily understood, this method, however, has disadvantages from a commercial viewpoint because it needs more than a stoichiometric amount of a highly corrosive Lewis acid. Furthermore, electrophilic aromatic substitution methods do not have sufficient versatility for linking aromatic nuclei and freedom from side reactions to effect synthesis of a wide range of high molecular weight polymers.

The evolution of the class of polymers provided by electrophilic aromatic substitution methods to a much broader range of poly(aryl ether) polymers was achieved by Johnson et al., Journal of Polymer Science, A-1, Vol. 5, 1967, pp. 2415-2427; Johnson et al., U.S. Pat. Nos. 4,108,837 and 4,175,175. Johnson et al. show that a very broad range of poly(aryl ether) polymers can be formed by the nucleophilic aromatic substitution (solution condensation polymerization) reaction of an activated aromatic dihalide and an aromatic diol in a substantially anhydrous dipolar aprotic solvent at elevated temperature. Ether bonds are formed via displacement of halogen by phenoxide anions with removal of halogen as alkali metal halide. Polycondensations in accordance with this method are, usually, performed in certain sulfoxide or sulfone solvents and the use of these dipolar aprotic solvents is an important feature of the process. The anhydrous dipolar aprotic solvents dissolve both the reactants and the polymers, and their use to enhance the rates of substitution reactions of this general type is well known. By this method, Johnson et al. created a host of new poly(aryl ether) polymers including broad classes of poly(aryl ether ketone) and poly(aryl ether sulphone) polymers which are acceptable for use under stress at high temperatures, often in excess of 150° C., and display thermoplasticity below their temperature of decomposition, but well above 150° C.

Thus, poly(aryl ether) polymers are well known; they can be synthesized from a variety of starting materials; and they can be made with different melting temperatures and molecular weights. Most interesting of the poly(aryl ether) polymers are crystalline, and at sufficiently high molecular weights, they are tough, i.e., they exhibit high values (>50 foot-pounds per cubic inch) in the tensile impact test (ASTM D-1822). They have potential for a wide variety of uses, and their favorable properties class them with the best of the engineering polymers.

There are many patents disclosing nucleophilic aromatic substitution methods for preparing polyarylene polyethers. For example, U.S. Pat. Nos. 4,108,837 and 4,175,175 describe the preparation of polyarylene polyethers, and in particular, polysulfones. Several one-step and two-step processes are described in these patents. In a one-step processe, a double alkali metal salt of a dihydric phenol is reacted with a dihalobenzenoid compound in the presence of sulfone or sulfoxide solvents under substantially anhydrous conditions.

In a two-step process, a dihydric phenol is first converted, in situ, in the presence of a sulfone or sulfoxide solvent to the alkali metal salt by reaction with an alkali metal or alkali metal compound. After removing water, a dihalobenzenoid compound is reacted with the double salt. Further, the alkali metal salt of the dihydric phenol may be added in the solvent to the dihalobenzenoid compound either continuously, incrementally or all at once to achieve the polymerization reaction. Several other variations of the process are described in the patents.

Canadian Patent No. 847,963 describes a process for preparing polyarylene polyethers. The process comprises contacting equimolar amounts of dihydric phenol and a dihalobenzenoid compound and at least one mole of an alkali metal carbonate per mole of dihydric phenol. The dihydric phenol is reacted in situ with the alkali metal carbonate to form the alkali metal salt thereof, and the formed salt reacts with the dihalobenzeoid compound to form the polyarylene polyether in the usual fashion.

U.S. Pat. No. 4,176,222 describes the preparation of aromatic polyethers containing $SO_2$ and/or CO linkages by a nucleophilic reaction utilizing a mixture of sodium carbonate or bicarbonate and a second alkali metal carbonate or bicarbonate. The alkali metal of the second alkali metal carbonate or bicarbonate has a higher atomic number than that of sodium. The second alkali metal carbonate or bicarbonate is used in amounts such that there are 0.001 to 0.2 gram atoms of the alkali metal of higher atomic number per gram atom of sodium. The process is stated to take place faster when the combination of sodium carbonate or bicarbonate and the second alkali metal carbonate or bicarbonate are used. Also, the products are stated to be of higher molecular weight using such a combination.

The patent describes in Example 17 that when the reaction is carried out using only sodium carbonate, a polymer is obtained having a reduced viscosity of 0.60 deciliter per gram as measured in concentrated sulfuric acid at 25° C. at a concentration of one gram per 100 milliliters. However, it is stated in the patent that when the polymer was compression-molded into a film, the film was brittle and dark grey in color. In Example 18 of the patent, the polymerization was carried out using potassium carbonate instead of sodium carbonate and a high molecular weight polymer was produced (reduced viscosity of 1.55 as measured in concentrated sulfuric acid at 25° C. at a concentration of one gram per 100 milliliters). However, the polymer was stated to contain a quantity of gel, and also, the reaction vessel had acquired a black coating. In Example 19 of the patent, a mixture of potassium carbonate and sodium carbonate was used. The patent stated that the polymer produced had a high reduced viscosity and that a tough off-white film was formed from it. Also, no gel was present in the polymer and the reaction vessel had not become discolored.

U.S. Pat. No. 4,320,224 also describes the production of aromatic polyetherketones in the presence of an alkali metal carbonate or bicarbonate in an amount providing at least 2 gram atoms of alkali metal per mole of starting bisphenol. The patent states that the sole use of sodium carbonate and/or bicarbonate is excluded.

U.S. Pat. No. 3,941,748 describes the use of alkali metal fluoride for preparing polyarylethers. The process requires that sufficient fluoride be present so that the total fluoride available (including that from any fluoroaryl monomers) can be at least twice the number of phenol (—OH) groups. The examples show it to be, in general, a slow process.

Imai, et al., in Makromol Chem., 179, pp.2989-2991, 1978 describe the preparation of polysulfones in dipolar aprotic solvents using at least 500 mole percent of potassium fluoride based on the bisphenol. The process uses relatively low temperatures (about 100° C.) to avoid polymer degradation but requires very long reaction times (48 to 70 hours).

U.S. Pat. No. 4,169,178 refers to the British counterpart of U.S. Pat. No. 3,941,748, i.e., British Pat. No. 1,348,630. The patent states that the amount of alkali metal carbonate required may be reduced in the preparation of aromatic polyethers by employing fluorophenols or difluorobenzenoid compounds as part or all of the halogen-containing reactants. The patent states that the process gives faster reactions and higher molecular weights and less colored polymers than a process using potassium fluoride in place of potassium carbonate.

German Patent Application No. 3,342,433 describes a process for the preparation of aromatic polyethers which uses a mixture of (a) a lithium and/or an alkaline earth metal carbonate and (b) a sodium, potassium, rubidium and/or cesium carbonate. The patent application states that it was totally unexpected to discover that high molecular weight polymers can be prepared via the nucleophilic polycondensation if one uses the combination of the essentially nonreactive carbonates selected from the group of lithium or alkaline earth metal carbonates, with small amounts, that are per se insufficient to perform a successful polymerization of a carbonate selected from the group of sodium, potassium, rubidium or cesium carbonates.

European Patent Application No. 182,648 discloses a process for the preparation of an aromatic polymer which comprises (a) effecting the condensation of at least one halophenol; or (b) effecting the condensation of a mixture of at least one bisphenol with at least one dihalobenzenoid compound; or (c) effecting the condensation of (i) at least one halophenol and (ii) a mixture of at least one bisphenol with at least one dihalobenzenoid compound in the presence of at least a base and at least one copper compound wherein the base is in stoichiometric excess relative to the phenolic groups in (a), (b), or (c), at least one of the compounds in (a), (b), or (c) being a compound containing a ketone group, and in the halophenol or the dihalobenzenoid compound the, or each, halogen atom being activated by an inert electron-withdrawing group in at least one of the positions ortho- or para- to the, or each, halogen atom. The patent application states that polymers of increased molecular weight, as indicated by inherent viscosity, may be obtained from chlorine- or bromine-containing monomers or a polymer of the same molecular weight or may be obtained using a shorter polymerization time. Alkali metal hydroxides, carbonates or bicarbonates are cited as useful bases.

U.S. Pat. No. 4,638,044 describes the use of sodium carbonate or bicarbonate and an alkali metal halide selected from potassium, rubidium, or cesium fluoride or chloride or combinations thereof. This process still makes use of relatively high amounts of fluoride salts which are corrosive; moreover, the rates of polymerization are relatively low.

Johnson et al., Journal of Polymer Science, A-1, Vol. 5, 1967, pp. 2375-2398, compared the reactivities of various activated aromatic dihalides with an alkali metal salt of bisphenol-A in a dimethylsulfoxide solvent and concluded that aromatic fluorides are much more reactive than aromatic chlorides having the same structure and produce polyethers having a higher degree of polymerization. From the viewpoint of reactivity, fluorides are preferred. In fact fluorides may be needed provide to a high molecular weight aromatic polyether, particularly where the aromatic halo compound does not contain a highly electron withdrawing group in a para- or ortho-positions relative to the halogen atoms and the halogen atoms, therefore, are not sufficiently activated. From an economic point of view, however, chloride compounds are more advantageous because of their low cost as compared with the corresponding aromatic fluoride compound.

Reactivity of the alkali metal salt of the aromatic hydroxy compound employed as the nucleophilic monomer is also significant. Commercially, sodium and/or potassium salts are usually used. Although sodium salts are advantageous from an economic point of view, potassium salts are often chosen because the nucleophilic properties of the phenoxide anion are excellent. In a particular case where an aromatic halo compound does not contain a sufficiently highly electron withdrawing group in a para- or ortho-positions relative to the halogen atoms, the halogen atoms are not sufficiently activated and, because of its low reactivity such aromatic chloro compound, a high molecular weight aromatic polyether cannot be obtained unless a potassium salt is used.

Nucleophilic aromatic substitution methods for preparing polyarylene polyethers, however, involve using dipolar aprotic solvents having high boiling points, such as dimethylformamide, N-methyl pyrolidirone, dimethyl sulfoxid and diphenyl sulfone. Thus, disadvantageously, it was necessary to use additional steps and time to isolate and purify the resulting polymers after completion of the reaction. Because of the necessity for removing by-produced salts and because of the problem regarding recovery of dipolar aprotic solvents having high boiling points, conventional prior methods have certain deficiencies and disadvantages, such as poor productivity and high costs.

Thus, there exists in the prior art a need for a manufacturing process for producing polyether resins which does not use dipolar aprotic solvents having high boiling points to produce the resin. A process for preparation of high molecular weight poly(aryl ether) polymers without need of polar aprotic solvents, expensive fluoro monomers, and/or potassium salts of phenols would be more particularly advantageous.

Accordingly, an object of the invention is to eliminate or reduce the aforementioned and other disadvantages and deficiencies of the prior art processes.

SUMMARY OF THE INVENTION

The objects of this invention are provided in a process for the preparation of poly(aryl ether) polymer resin having a basic structure comprising recurring units of the formula:

—O—E—O—E'—O— where E is the residuum of a dihydric phenol and E' is the residuum of the benzenoid compound having an inert electron-withdrawing group in at least one of the positions ortho and para to the valence bonds; both of the residua are valently bonded to ether oxygens through aromatic carbon atoms, by reacting about equimolar amounts of (I) an alkali metal double salt of dihydric phenol of the formula:

MO—E—OM' where M and M' are alkali metal ions selected from the group consisting of lithium, sodium, potassium and cesium ions with (II) a benzenoid compound of the formula:

X—E'—X' where X and X' are halo-ions independently selected from the group consisting of fluorine and chlorine ions, in the presence of a selected macro bicyclic organic compound catalyst. The process is conducted at conditions sufficient to effect formation of the desired poly(aryl ether) polymer resin, preferably at temperatures above about 100° C. and below the decomposition temperatures of the poly(aryl ether) polymer resin formed, reactants, catalyst, and solvent, if any, employed.

In one embodiment of the present invention the process comprises the steps of:

(a) reacting a dihydric phenol with about a stoichiometric amount of a source of alkali metal selected from the group consisting of alkali metal hydride, hydroxide, alkoxide or alkyl compounds in the presence of a solvent to form the alkali metal double salt of the dihydric phenol of the formula:

MO—E—OM' where M and M' are alkali metal ions selected from the group consisting of lithium, sodium, potassium and cesium ions, (b) removing water from the reacting mixture by codistillation with an azeotrope forming solvent, and (c) admixing about an equimolar amount of a benzenoid compound of the formula:

X—E'—X' where X and X' are halogen ions independently selected from the group consisting of fluorine and chlorine ions, in the presence of the macro bicyclic organic compound catalyst, at temperatures above about 100° C. and below the decomposition temperatures of the poly(aryl ether) polymer resin formed, reactants, catalyst, and solvent, if any, employed.

It is desirable that the dihalo benzenoid compound and the alkali metal double salt of dihydric phenol be mixed in about equimolar amounts, i.e., the excessive amount of one component be not more than 5 mol percent of the equimolar amount.

Catalysts useful in this invention comprise a macro bicyclic organic compound having nitrogen bridgehead atoms linked together by three hydrocarbon bridging chains and having in each of the hydrocarbon bridging chains at least one additional hetro atom selected from the group consisting of oxygen, nitrogen and sulfur. Preferred are diazabicyclo-macrocyclic compounds wherein the bridging chains are polyethers, particularly ethyleneoxy polyethers.

Catalysts to be used in the present invention can, advantageously, be in an immobilized form using any suitable inert support, such as anchored or bound to a synthetic resin. Catalysts in an anchored, bound, and immobilized forms are easily recovered after completion of the polymerization as by filtration and can be used repeatedly.

In other preferred embodiments of the process according to the present invention the benzenoid compound is a dichlorobenzenoid, more preferably the benzenoid compound is 4,4'-dichlorodiphenylsulfone and the alkali metal double salt is derived from 2,2-bis(hydroxyphenyl)-propane (bisphenol-A). One notable advantage of such process is the fact that dichloro benzenoid compounds, which are less easily polymerized than their corresponding difluoro-compounds, can be used to obtain useful poly(aryl ether) polymer resins. As will be easily understood, that what can be a substantial commercial advantage is not obtained in cases using a difluoro-benzenoid compound.

A notable advantage of a process according to the present invention is the fact that when a solvent is employed, it can be a nonpolar solvent, i.e., a solvent which, on a commercial scale, does not exhibit the disadvantages of the heretofore used polar aprotic solvents. It is even possible to use the dihalobenzenoid compound itself as the solvent in certain cases. It is obvious that it is also possible to use a polar solvent, although the commercial advantage is substantially less in this particular case.

BRIEF DESCRIPTION OF THE INVENTION

The polyarylene polyether resins which may be prepared by the improved process of this invention are linear, thermoplastic polyarlene polyethers wherein the arylene units are interspersed with ether, sulfone or ketone linkages. These resins may be obtained by reaction of an alkali metal double salt of a dihydric phenol and a dihalobenzenoid, either or both of which contain a sulfone or a ketone linkage, i.e., —$SO_2$— or —CO—, between arylene groupings, to provide sulfone or ketone units in the polymer chain in addition to arylene units and ether units. The polymer has a basic structure comprising recurring units of the formula:

—O—E—O—E'—O— where E is the residuum of a dihydric phenol and E' is the residuum of the benzenoid compound having an inert electron-withdrawing group in at least one of the positions ortho and para to the valence bonds; both of the residua are valently bonded to ether oxygens through aromatic carbon atoms.

Such aromatic polyethers are included within the class of polyarylene polyether resins described in U.S. Pat. No. 3,264,536, the disclosure of which is hereby incorporated herein by reference, for the purpose of describing and exemplifying E and E' in more detail. It is preferred that the dihydric phenol be a weakly acidic dinuclear phenol, such as, for example, the dihydroxy diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. While these halogenated bisphenolic alkanes are more acidic than the non-halogenated bisphenols and hence slower in reacting in this process, they do impart valuable flame resistance to these polymers. Other materials also termed appropriately "bisphenols" are also highly valuable and preferred. These materials are the bisphenols of a symmetrical or unsymmetrical joining group, as, for example, ether oxygen (—O—), carbonyl (—$\overset{O}{\underset{\|}{C}}$—), sulfide (—S—), sulfone (—$\overset{O}{\underset{\underset{O}{\|}}{\overset{\|}{S}}}$—), or hydrocarbon residue in which the two phenolic nuclei are joined to the same or different carbon atoms of the residue.

Such dinuclear phenols can be characterized as having the structure:

$$HO—(Ar—R_1—Ar)—OH$$
$$\overset{(A_1)_a \quad (A_2)_b}{}$$

where Ar is an aromatic group and preferably is a phenylene group; $A_1$ and $A_2$ can be the same or different inert substituent groups, such as alkyl groups having from 1 to 4 carbon atoms, or alkoxy radicals having from 1 to 4 carbon atoms; a and b are integers having a value from 0 to 4, inclusive; and $R_1$ is representative of a bond between aromatic carbon atoms, such as in dihydroxy-diphenyl, or is a divalent radical, including, for example, radicals such as —CO—, —O—, —S—, —SO—, —S—S—, —$SO_2$—, and divalent hydrocarbon radicals, such as alkylene, alkylidene, cycloalkylene, cycloalkylidene, or the halogen, alkyl, aryl, or like substituted alkylene, alkylidene and cycloaliphatic radicals as well as aromatic radicals and rings fused to both Ar groups.

Examples of specific dihydric polynuclear phenols include among others: bis-(hydroxyphenyl) alkanes such as;
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3,-hexafluoropropane, and the like;
di(hydroxyphenyl)sulfones, such as
bis-(4-hydroxyphenyl sulfone),
2,4'-dihydroxydiphenyl sulfone,
5-chloro-2,4'-dihydroxydiphenyl sulfone,
5'-chloro-4,4'-dihydroxydiphenyl sulfone; and
di(hydroxyphenyl)ethers, such as
bis-(4-hydroxyphenyl)ether,
4,3'-dihydroxydiphenyl ether,
4,2'-dihydroxydiphenyl ether,
2,2'-dihydroxydiphenyl ether,
2,3'-dihydroxydiphenyl ether,
4,4'-dihydroxy-2,6-dimethyldiphenyl ether,
bis-(4-hydroxy-3-isobutylphenyl)ether,
bis-(4-hydroxy-3-isopropylphenyl) ether,
bis-(4-hydroxy-3-chlorophenyl) ether,
bis-(4-hydroxy-3-fluorophenyl) ether,
bis-(4-hydroxy-3-bromophenyl) ether,
bis-(4-hydroxynaphthyl) ether,
bis-(4-hydroxy-3-chloronaphthyl) ether,
4,4'-dihydroxy-3,6-dimethoxydiphenyl ether.

As used herein the E term, defined as being the "residuum of the dihydric phenol," of course refers to the residue of the dihydric phenol after the removal of the two aromatic hydroxyl groups. Thus, as is readily seen, these polyarylene polyethers contain recurring groups of the residuum of the dihydric phenol and the residuum of the benzenoid compound bonded through aromatic ether oxygen atoms.

Any dihalobenzenoid compound or mixtures thereof can be employed in this invention which compound or compounds have the two halogens bonded to benzene rings having an electron-withdrawing group in at least one of the positions ortho and para to the halogen. The dihalobenzenoid compound can be either mononuclear where the halogens are attached to the same benzenoid ring or polynuclear where they are attached to different benzenoid rings, as long as there is an activating electron- withdrawing group in the ortho or para position of that benzenoid nucleus. Fluorine and chlorine-substituted benzenoid reactants are preferred: the fluorine compounds for fast reactivity and the chlorine compounds for their inexpensiveness.

Any electron-withdrawing group can be employed as the activator group in these compounds. It should, of course, be inert under the reaction conditions, but otherwise its structure is not critical. Preferred are the strong activating groups such as the sulfone group

bonding two halogen benzenoid nuclei as in 4,4'-dichlorodiphenyl sulfone and 4,4'-difluorodiphenyl sulfone, although such other strong withdrawing groups hereinafter mentioned can also be used with equal ease.

The more powerful of the electron-withdrawing groups give the fastest reactions and hence are preferred. It is further preferred that the ring contain no electron-supplying groups on the same benzenoid nucleus as the halogen; however, the presence of other groups on the nucleus or in the residuum of the compound can be tolerated. Preferably, all of the substituents on the benzenoid nucleus are either hydrogen (zero electron-withdrawing) or other groups having a positive sigma value, as set forth by J. F. Bunnett et al., in Chemical Review, Vol. 49, pp. 274–412 (1951). See also Taft, Steric Effects in Organic Chemistry, John Wiley & Sons (1956), chapter 13; Chemical Review, Vol. 53, 222; JACS, 74, 3120; and JACS, 75, 4231.

If desired, polymers may be made with mixtures of two or more dihalobenzenoid compounds. Thus, the E' residuum of the benzenoid compounds in the polymer structure may be the same or different.

It is seen also that as used herein, the E' term defined as being the "residuum of the benzenoid compound," refers to the aromatic or benzenoid residue of the compound after the removal of the halogen atoms on the benzenoid nucleus.

A preferred form of the polyarylene polyethers of this invention are those prepared using the dihydric polynuclear phenols of the following four types, including the derivatives thereof which are substituted with inert substituent groups, such as

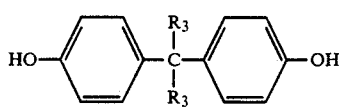
(a)

in which the $R_3$ group represents independently hydrogen, lower alkyl, aryl and the halogen-substituted groups thereof, which can be the same or different and in which each $R_3$ is preferably methyl;

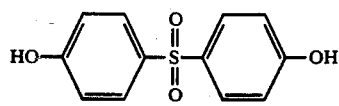
(b)

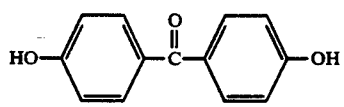
(c)

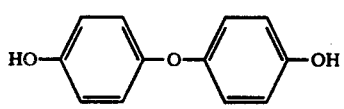
(d)

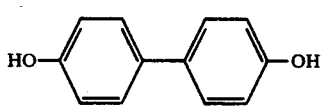
(e)

and substituted derivatives thereof.

It is also contemplated in this invention to use a mixture of two or more different dihydric phenols to accomplish the same ends as above. Thus, when referred to above, the E residuum in the polymer structure can actually be the same or different aromatic residua.

The virgin poly(aryl ether) polymer resins prepared by the improved process of this invention have a color factor, as measured on filtered resin reactor solutions, less than the color factor of resins prepared by processes which require the use of a polar aprotic solvent.

The preferred poly (aryl ether)s have repeating units of the formula:

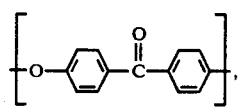
(1)

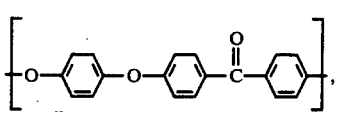
(2)

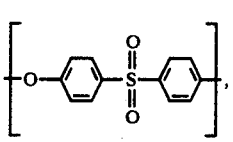
(3)

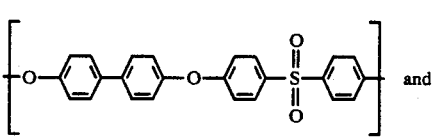 and
(4)

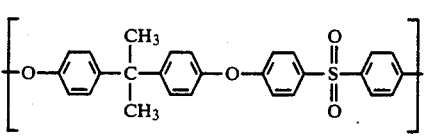
(5)

As indicated above, catalysts useful in this invention comprise a macro bicyclic compound having nitrogen bridgehead atoms linked together by hydrocarbon bridging chains and having in each of the hydrocarbon bridging chains at least one additional hetero atom selected from the group consisting of oxygen, nitrogen and sulfur atoms. These macro bicyclic compounds are disclosed and claimed in U.S. Pat. No. 3,966,766 and 4,156,683 in the name of Lehn, the disclosures of which are hereby incorporated by reference. Additional disclosure of these macro bicyclic compounds is found in Lehn, J. K., "Cryptate Inclusion Complexes, Effects On Solute-Solute And Solute-Solvent Interactions And On Ionic Reactivity", Pure and Appl. Chem., Vol. 52, pp. 2303-2319, which is hereby incorporated by reference. Preferred are macrocyclic compounds selected from the group consisting of the following structural formula:

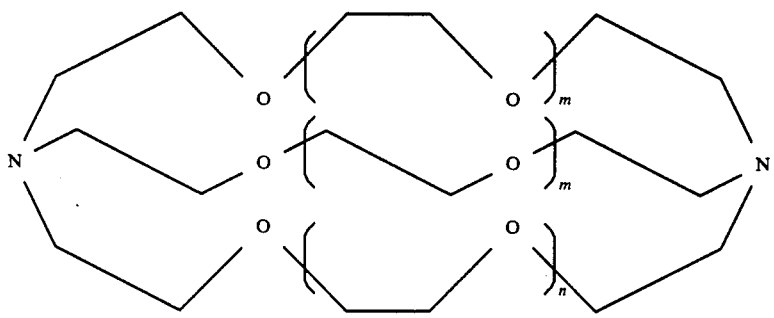

where m and n are independently numbers selected from the group consisting of 0 and 1 with the proviso that either m or n is 1. More preferred are macro bicyclic compounds where m is 0 and n is 1 ([2.1.1] cryptand), m is 1 and n is 0 ([2.2.1] cryptand), and m and n are 1 ([2.2.2] cryptand). Also preferred are alkylated cryptands, such as 5-decyl(2.2.2)-cryptand. Advantageously, m and n are selected to accommodate particular alkali metal double salts of dihydric phenols. Selection of the most suitable catalyst for carrying out the process according to the invention is made with regard to the size of the alkali metal cations M and M'. The larger effective radius of the cation, the greater must be the hydrocarbon bridging chains. Thus, [2.1.1] cryptand is preferred where M and M' are lithium ions, [2.2.1] cryptand is preferred where M and M' are sodium ions and [2.2.2] cryptand is preferred where M and M' are potassium ions.

Thus, preferred embodiments of the present invention include process: wherein the alkali metal ions M and M' are lithium ions, preferably m is 0 and n is 1; wherein M and M' are sodium ions, preferably m is 1 and n is 0; and wherein M and M' are potassium ions, preferably m and n are 1.

Any catalytically effective amount of catalyst may be used according to the present invention. Typically, an effective amount is in a range from about 0.001 to about 0.2, preferably from about 0.01 to about 0.1.

The polyarylene polyether polymers are prepared, generally, by the procedures as set forth in U.S. Pat. Nos. 4,108,837 and 4,175,175, i.e., by the substantially equimolar reaction of a double alkali metal salt of a dihydric phenol with a dihalobenzenoid compound except that the presence of liquid organic sulfone or sulfoxide solvents and cosolvents under substantially anhydrous conditions are not required in the instant invention, because the preselected catalysts described herein are used for this reaction. The polymers may be prepared in a two-step process in which a dihydric phenol is first converted to the alkali metal salt by the reaction with the alkali metal or alkali metal hydride, hydroxide, alkoxide or alkyl compounds. Preferably, the alkali metal hydroxide is employed. After removing the water which is present or formed, in order to secure substantially anhydrous conditions, the polymer is formed by admixing and reacting about stoichiometric quantities of the dihalobenzenoid compound. Polyarylene polyethers are also prepared according to the present invention by simultaneously contacting about stoichiometric amounts of an alkali metal or alkali metal hydride, hydroxide, alkoxide or alkyl compounds with a dihydric phenol in a solvent mixture comprising an azeotrope former or cosolvent and, if desired, a reaction solvent in a weight ratio of from about 10/1 to about 1/1, preferably from about 4/1 to about 3/1; removing water from the reaction mass by codistillation with the azeotrope-forming solvent until substantially anhydrous conditions are attained; where a reaction solvent is used, adjusting the ratio of azeotrope former to reaction solvent from about 1/1 to about 1/10, preferably from about ½ to about ¼, by removing excess azeotrope former; and reacting the alkali metal double salt with the dihalobenzenoid compound in a condensed phase, liquid and/or solid.

If a solvent is used, it can be a substantially non-polar organic liquid. Generally, in order to obtain the best results according to the invention, the reactions are carried out using an organic solvent. The identity of the liquid is not critical, provided it possesses the stated properties. It must solubilize the catalyst (the latter being soluble in a majority of customary solvents); it must also be chemically inert vis-a-vis the salts to be dissolved. Illustrative liquids which can be used within the scope of the process according to the invention are: halogenated hydrocarbons, such as chlorobutane, chloroform, dichloroethane, benzyl chloride, methylene chloride, monochlorobenzene, and ortho-dichlorobenzene; aromatic hydrocarbons, such as benzene, toluene, o-, m- and p-xylene; and other solvents, such as anisole, nitromethane, and nitro benzene. These can be used singly or in combination of two or more.

In the polymerization reaction it is, typically, desirable that the reaction mixture be maintained substantially anhydrous before and during the polymerization reaction. While amounts of water up to about one percent can be tolerated, amounts of water substantially greater than this are desirably avoided as the reaction of water with the dihalobenzenoid compound leads to formation of phenolic species and only low molecular weight products are secured. Optimal amounts of water for various reacting systems are easily determined experimentally.

In situations where it is desired to prepare the alkali metal salt of the dihydric phenol in situ in a reaction solvent, the dihydric phenol and an alkali metal or alkali metal halide, hydroxide, alkoxide or alkali compounds are admixed in essentially stoichiometric amounts i.e., the excessive amount of one component be not more than 5 mol percent of the stoichiometric amount, and normal precautions taken to remove all the water of neutralization preferably by distillation of a water-containing azeotrope from the solvent-metal salt mixture.

It has been found convenient to employ benzene, xylene, halogenated benzenes, or other inert organic azeotrope-forming organic liquids in performing this reaction. Heating the alkali metal hydroxide, dihydric phenol and small amounts of the azeotrope former to reflux for several hours while removing the azeotrope is most desirable. However, it is obvious that any other technique for removing essentially all of the water can be equally satisfactory.

It is not essential and critical in this reaction that all of the azeotropic former be removed before the reaction of the alkali metal salt of the bisphenol with the dihalobenzenoid compound. In fact, it is desirable in some instances to employ an amount of such material in excess of that needed to azeotrope off all of the water, with the balance being used as a principal reaction solvent, a cosolvent, or inert diluent with a principal reaction solvent. Thus, for instance, benzene, heptane, xylene, toluene, chlorobenzene, dichlorobenzene and like inert liquids can be beneficially employed.

The azeotrope former can be either miscible or immiscible with a principal reaction solvent. If it is not miscible, it should be one which will not cause precipitation of the polymer in the reaction mass. Heptane is such a solvent. When employed, it will merely remain inert and immiscible in the reaction mass. If the azeotrope former would cause precipitation of the polymer, it should be removed almost completely from the reaction mass before initiating polymerization.

For such reasons, it is preferred to employ azeotrope formers which are miscible with the major solvents and which also act as cosolvents for the polymer during polymerization. Chlorobenzene, dichlorobenzene and xylene are azeotrope formers of this class. Preferably the azeotrope former should be one which boils below the decomposition temperature of the major solvent and which is perfectly stable and inert in the process, particularly inert to the alkali metal hydroxide when the alkali metal salt of the dihydric phenol is prepared in situ in the presence of the inert diluent or azeotrope former.

Chlorobenzene and o-dichlorobenzene serve particularly well as solvent or cosolvent. The halogenated benzenes, for example, not only permit the formed polymer to remain in solution and thus produce high molecular weight polymers, but also provide a very economical processing system and an effecting dehydration operation.

Any of the alkali metals or alkali metal hydrides, hydroxides, alkoxides or alkyl compounds can be employed in this technique. Alkali metal hydroxides are preferred. Potassium and cesium salts have been found to react considerably faster than the sodium salts, but due to expense of the cesium salts, the sodium or potassium salts are preferred. As heretofore indicated, the alkali metal salt should, of course, be the double metal salt, i.e., both aromatic hydroxyl groups being saponified, in order to prepare these products. Single metal salts ordinarily limit the molecular weight of the product. While this may be desirable as a chain terminator or molecular weight regulator near the end of the reaction period, the initial reaction and the major portion thereof should be with the double alkali metal salt of the dihydric phenol. The alkali metal moieties of this compound, however, can be the same or different alkali metals.

In the process of this invention, the alkali metal or alkali metal hydride, hydroxide, alkoxide or alkyl compound is then added and reacted with the dihydric phenol to form its alkali metal double salt. The mixture is heated and codistilled with solvent to remove water from the reacting mixture. During the early stages of codistillation, a cosolvent, if any, can be added to the reaction mixture. A dihalobenzenoid compound is added with a preselected macro bicyclic compound, and the polymerization takes place as described above.

In a process according to the present invention, it is preferable that the presence of oxygen be kept minimal during the formation and dehydration of the alkali metal salt of the dihydric phenol. Therefore, a nitrogen purge of the initial reactor charge is helpful in minimizing the presence of oxygen. Also, sparging nitrogen into the reaction vessel during the simultaneous addition of the solvent and the alkali metal or alkali metal hydride, hydroxide, alkoxide or alkyl compound, facilitates oxygen removal from the reactor.

The alkali metal or alkali metal hydride, hydroxide, alkoxide or alkyl compounds are preferably added to the dihydric phenol at a reactor temperature of from about 40° to about 60° C. The alkali compounds are added such that the stoichiometry of alkali compounds to dihydric phenol is from about 99.2 percent to about 99.7 percent. Stoichiometry below about 99.2 percent and above about 99.7 percent tends to promote color generation.

The polymerization reaction, i.e., the reaction between the alkali metal salt of the dihydric phenol and the dihalobenzenoid compound, is carried out at temperatures in a range upward from about 100° C. and below the decomposition temperatures of the polymer formed, the reactants, the catalyst, and the polymerization solvent, if any, employed.

The polymerization temperature employed is, typically, in a range from about 100° C. to about 400° C. and will depend on the nature of reactants and solvent, if any, is used. For example, in the preparation of polysulfones in chlorobenzene and/or o-dichlorobenzene, this temperature is in the range of from about 100° to about 210° C., preferably from about 120° to about 190° C. more preferably about 130° C. to about 180° C. For production of the ketone analogues, temperatures in excess of 250° C., preferably above 270° C., are generally desirable. The reaction is carried out from about ¼ to about 25 hours, preferably from about ½ to about 10 hours.

To minimize cleavage reactions, it is preferred that the maximum polymerization temperature is below 350° C. and in particular is the lowest that gives a convenient polymerization time. For the production of some polymers, it may be desirable to commence polymerization at one temperature, e.g. between 150° C. and 200° C., and to increase the temperature as polymerization ensues. This is particularly advantageous when making polymers having only a low solubility in the solvent. In that case it is desirable to increase the temperature progressively to maintain the polymer in solution as its molecular weight increases.

Where solvent is employed, the temperature should be sufficient to maintain the reactants and/or the polymer produced therefrom, in the molten state.

In a further embodiment of this invention, a fractionation column can be used to facilitate dehydration of the polyarylether reaction system, i.e., to remove the water formed during the reaction between the alkali metal compounds and the dihydric phenol. A fractionation column facilitates water removal from the azeotrope former/water/solvent mixture boiled-up during dehydration, shortens the time required to effect batch dehydration, and minimizes the boil-up and subsequent removal of the reaction solvent from the polyarylether reaction mixture, thereby affording a reduction in the total solvent reactor charge. The higher solvent reactor concentrations which arise through the use of a fractionation column have been found to produce minimal polyarylether color formation when the improved processes of this invention are used together with a reduction in the solvent reactor charge.

The reduced viscosity of the resulting polymer can be suitably adjusted by changing kinds and amounts, i.e. mol ratio, of compounds used in the process. Typically, product polymers having reduced viscosity in a range of from 0.1 to about 1.5, measured as a 0.2 percent solution in chloroform at 25° C., are easily obtained. Polymers having a reduced viscosity of 0.2 or more are preferred from a standpoint of mechanical and electrical properties of the polymer.

The present invention is described in greater detail with reference to the following actual examples of the invention and comparative examples. These examples, are for illustrative purposes and are not to be construed to be limiting of the invention.

Residual phenolic concentrations were measured by a non-aqueous titration using tetrabutyl ammonium hydroxide as base.

PREPARATIVE EXAMPLE 1

In this example the dipotassium salt hexahydrate was prepared from bisphenol-A. A 5L, four-neck, round-bottom flask was equipped with a stainless steel stirrer, condenser, a nitrogen inlet, a thermocouple, and an addition funnel. The flask was charged with bisphenol-A (2,2- bis(hydroxyphenyl)-propane, 228.28 g, 1.0 mole) and isopropanol (1L). The flask and its contents were heated to reflux by a heating mantle. After cooling to 80° C., aqueous potassium hydroxide (246.13 g, 45.7 wt. percent, __ mol) was added from the addition funnel. Without removing the mantle, the flask and reaction product were cooled to about 40° C. and then placed in an ice-bath. To help recover precipitated reaction product, ice cold isopropanol (2L) was added. Product was recovered by filtration and washed with ice cold ether (2×1L). The product was rendered solvent-free by keeping it under vacuum above 100 mm Hg with a nitrogen bleed at room temperature and identified as bisphenol-A dipotassium salt hexahydrate. The amount of phenoxide (4.84 milli eq/g) was measured by an acid-base titration which indicated a molecular weight of 413.22. The calculated molecular weight for the hexahydrate is 412.56.

EXAMPLE 1

In this example dichlorodiphenyl sulfone and bisphenol-A dipotassium salt hexahydrate of Preparative Example 1 were reacted by [2.2.2] cryptand and produced a poly(aryl ether) polymer having the the following basic structural formula:

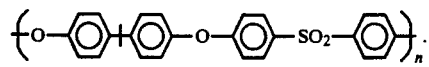

A 100 mL, four-neck, round-bottom flask was equipped with a mechanical stainless steel stirrer through the center neck using a custom-made brass adaptor. A thermocouple and a vacuum jacketed condenser were attached to a second neck of the flask through a Claisen adaptor. On top of the vacuum jacketed condenser were placed a two-way addition funnel and a water cooled condenser. A nitrogen inlet was attached to the third neck and the fourth neck was stoppered.

The flask was charged with bisphenol-A dipotassium salt hexahydrate of Preparative Example 1 (16.48 g, 40 mmol) and dichlorobenzene (40 mL). The flask and its contents were heated to 150° C. in an oil batch. Chlorobenzene (100 mL) taken in an addition funnel was added drop by drop, over a period of 2 hours. The distillate trapped in the two-way addition funnel contained the water of hydration (about 2.0 mL, 50 percent). Using a spatula, the salts adhering to the flask were made free by scratching. Dichlorodiphenyl sulfone (11.487 g, 40 mmol) and [2.2.2] cryptand (0.75 g, 5 mole percent) were added as solid quickly. The reaction was kept at 180° C. for 2 hours. The resulting viscous solution was then cooled to room temperature; treated with chlorobenzene containing 2.0 mL glacial acetic acid. The salts were filtered off through a sintered funnel. The polysulfone polymer was recovered by coagulation into methanol and dried at 100° C. under 50 mm Hg vacuum. The reduced viscosity of the polymer, measured as 0.2 percent solution in chloroform at 25° C. (0.2 g/100 mL CHCl₃, 25° C.), was 0.84 dL/g. The calculated number average molecular weight of this polysulfone polymer was 62,200.

COMPARATIVE EXAMPLE A

A slurry of bisphenol-A dipotassium salt hexahydrate (16.48 g, 40 mmol) in dichlorobenzene (40 mL) was heated to reflux to remove azeotropable water. After 2 hours of reflux, a hot solution of 4,4-dichlorodiphenyl sulfone (11.487 g, 40 mmol) in chlorobenzene (20 mL) was added. About 100 ml chlorobenzene was added drop by drop over 2 hours to remove water. The precipitated salts never dissolved. After 4 hours of reaction at 180° C., glacial acetic acid (10 mL) in chlorobenzene was added. Upon stirring, a homogeneous solution was obtained. Coagulation of this solution into methanol did not provide polymer.

EXAMPLE 2

A 250 mL, four-neck, round-bottom flask was equipped with an overhead stainless steel stirrer through a stuffing box, a nitrogen inlet, a Claisen adapter and a stopper. The Claisen adapter was attached to a thermocouple thermometer and a two-way addition funnel and a condenser. The flask was charged with aqueous potassium hydroxide (12.25 g, 45.8 percent. 100 mmol), water (10 mL) and bisphenol-A (11.4140 g, 50 mmol). Prepurified nitrogen was allowed to bubble into the reaction mixture and was maintained continuously throughout the reaction. After 0.5 hour at room temperature, while being stirred slowly, bisphenol-A dissolved completely. Toluene (100 mL) was added. After another 0.5 hour at room temperature, the reaction flask was immersed in an oil bath. The temperature was set at 115° C. and the batch was heated. Water that was collected at the two-way addition funnel as an azeotrope of toluene was removed and measured. Toluene was returned to the reactor. During the dehydration, a pressure equalizing addition funnel was charged with dichlorodiphenyl sulfone (14.3590 g, 5 mmol), [2.2.2] cryptand (0.94 g, 2.5 mmol) and dichlorobenzene (60 mL). Flexible electric heating tape was wrapped around the addition funnel. A nitrogen inlet was inserted from the top to the bottom of the addition funnel. The slurry was heated while being degassed to the point that the monomer dissolved and kept at that temperature. When the total amount of water removed was above 15.7 mL, the above hot solution of sulfone monomer was added. Immediately, a large amount of the disalt dissolved and the reaction became slightly yellowish. The temperature was now set to 150° C. and toluene was removed from the system. After 15 minutes, the temperature was set to 180° C. and all toluene was removed. The reaction was maintained at 180° C. for 3 hours. The viscous polymer solution thus obtained was cooled to room temperature and diluted with chlorobenzene (200 mL) containing glacial acetic acid (5 mL). The salts from the reaction were filtered through a sintered filter funnel (medium). The clear filtrate was coagulated into methanol (1.5L) in a large high-speed blender. The isolated polymer was dried at 110° C. and at 50 mm Hg vacuum. Reduced viscosity of the recovered and dried polymer measured 0.46 dL/g (0.2 g in 100 mL $CHCl_3$, 25° C.) and the phenolic end-group concentration was 41 micro eq/g.

COMPARATIVE EXAMPLE B

This comparative example is provided to show that polymerization takes place in dipolar aprotic solvents, specifically in dimethylacetamide without the presence of a phase transfer catalyst. Reactions run in dipolar aprotic solvents are not catalyzed reactions.

In a 500 mL, four-neck, round-bottom flask as equipped in Example 3 were placed bisphenol-A (45.656 g, 200 mmol), dichlorodiphenyl sulfone (57.436 g, 200 mmol), potassium carbonate (29.022 g, 210 mmol), toluene (75 mL) and dimethyl acetamide (200 mL). The reactor was placed in an oil bath and heated to 160° C. A reasonable reflux of toluene was maintained throughout the reaction. After 10 hours at 160° C., the reaction was diluted with chlorobenzene (300 mL) containing glacial-acetic acid (10 mL). The polymer was recovered as in Example 3. The reduced viscosity of the dried polymer was 0.45 dL/g (0.2 g in 100 mL $CHCl_3$, 25° C.).

EXAMPLE 3

In a 100 mL, four-neck, round-bottom flask as equipped in Example 1 were placed bisphenol-A (3.1952 g, 14 mmol), and aqueous KOH (16.50 g, 9.52 percent, 28 mmol). Potassium hydroxide was thoroughly washed in with 2×1 mL water. Prepurified nitrogen was allowed to bubble into the reaction mixture while slowly stirring. The nitrogen purge was maintained throughout the reaction. The bisphenol-A dissolved slowly and the solution became clear and slightly yellowish. Toluene (20 mL) was added and the degassing was continued for 0.5 hour. The reaction was stirred rapidly to degas both phases. The reaction was then immersed in an oil bath and the temperature was set to 115° C. The distillate collected at the two-way addition funnel contained an azeotropic mixture of water and toluene. The bottom water phase was removed from the reaction, whereas the top toluene phase was returned to the reaction. The temperature rose up to 105° C. in 1-1.5 hours when most of the water was removed. When the removed water was more than 16.0 mL, a hot solution of dichlorodiphenyl sulfone (4.020 g, 14 mmol) in dichlorobenzene (15 mL) was added from an addition funnel followed by the addition of polymer-bound [2.2.2] cryptand (E. Merck, 2 g, 0.35 meq/g) as solid. The temperature was then set at 150° C. Dispersed salts rapidly dissolved leaving only large chunks and what was stuck to the walls. The temperature was maintained at 150° C. until all toluene was removed (1 hour). Then the temperature was set to 180° C. The reaction was kept at 180° C. for 2-4 hours. The resulting non-homogeneous viscous solution was diluted with dichlorobenzene containing glacial acetic acid (2 mL). The solution was filtered through a medium porosity sintered funnel. The polymer was recovered as was described in Example 3 from the filtrate. The catalyst was filtered off along with reaction byproduct salts. The catalyst was recovered from this mixture by washing with 2×100 mL methylene chloride, 1×100 acetone, 3×100 mL deionized water, 1×100 mL acetone. The recovered polymer bound [2.2.2] cryptand beads were dried at 110° C. under vacuum and reused.

| Results of Immobilized Catalyst Runs | | | |
|---|---|---|---|
| Reaction | Catalyst | Conditions | Reduced Viscosity |
| 1 | Polymer-bound (2.2.2)cryptand | 180° C./5 h | 0.50 dL/g |
| 2 | Same[a] | 180° C./2 h | 0.48 dL/g |
| 3 | Same[a] | 180° C./4 h | 0.51 dL/g | a = The recovered catalyst from the earlier run was reused.

EXAMPLE 4

The preparation according to Example 2 was repeated except with 5 mole percent of 5-decyl(2.2.2)-cryptand (1 g) in place of [2.2.2] cryptand. After a 5-hour reaction time, the reaction was acidified and the polymer was recovered as in Example 3. The reduced viscosity of the dried polymer was 0.43 dL/g (0.2 g in 100 mL $CHCl_3$, 25° C.) and its calculated number average molecular weight was 19,918.

EXAMPLE 5

A 250 mL, four-neck, round-bottom flask was fitted with all accessories listed in Example 2. The reactor was charged with aqueous potassium hydroxide (12.15 g, 45.8 w/wt percent, 100 mmol), water (10 mL) and bisphenol-A (11.4140 g, 50 mmol). Prepurified nitrogen was bubbled into reaction mixture and was maintained throughout the reaction. Bisphenol-A dissolved completely at room temperature while being stirred slowly over 0.5 hour. Chlorobenzene (100 mL) was added and stirred at room temperature for another 0.5 hour. The reaction was heated to reflux in an oil bath. The temperature control was set at 115° C. The distillate collected at the two-way addition funnel, separated into two phases. The top aqueous phase was removed, but the bottom chlorobenzene phase was returned to the pot slowly. When the rate of reflux had slowed down, the temperature was raised to 135° C. and the dehydration was continued. When almost all the theoretical amount of water (16 mL) was removed, a boiling solution of dichlorodiphenyl sulfone (14.3590 g, 50 mL) and [2.2.2] cryptand (0.45 g, 2.5 mmol) in chlorobenzene (30 mL) was added slowly. The distilled chlorobenzene was not returned, but removed (60 mL) to adjust the reaction volume to 50 to 70 mL. The reaction was maintained at 135° C. for 2 to 5 hours. The resulting viscous solution was acidified with glacial acetic acid (5 mL) dissolved in chlorobenzene (200 mL). The polymer was recovered as in Example 3. Reduced viscosity of this polymer was 0.43 dl/g as measured as 0.2 g in 100 mL $CHCl_3$ solution at 25° C.

EXAMPLE 6

Into a reactor described in Example 3 was placed bisphenol-A (11.414 g, 50 mmol), difluorodiphenyl sulfone (12.7125 g, 50 mmol), potassium carbonate (7.60 g, 55 mmol) and chlorobenzene (75 mL). Prepurified nitrogen was bubbled into the reaction and was maintained throughout the reaction. After 0.5 hour, the reaction was heated to reflux and {2.2.2] cryptand (0.94 g, 2.5 mmol) was added. A vigorous reflux was maintained and any water that was azeotroped off was removed from the system. The reaction was maintained at 135° C. for 20 hours after which chlorobenzene (200 mL) containing g-acetic acid was added. The polymer was recovered as is described in Example 3. The reduced viscosity of the recovered polymer measured 0.53 dL/g (0.2 g in 100 mL $CHCl_3$, 25° C.).

EXAMPLE 7

Into a 100 mL, five-neck, round-bottom flask equipped with a mechanical stirrer, a nitrogen inlet, a thermocouple and an air-condenser was placed bisphenol S (12.5 g, 50 mmol), dichlorodiphenyl sulfone (14.35 g, 50 mmol), potassium carbonate (7.26 g, 52.5 mmol) and [2.2.2] cryptand (0.94 g, 5 percent). The contents were slowly heated to 280° C. for 3 hours. After cooling to room temperature, the contents were dissolved in N-methyl pyrrolidinone. When everything dissolved, chlorobenzene was added until the solution became slightly hazy. The salts were filtered off and the filtrate was coagulated into methanol to recover the polymer in high yield. The reduced viscosity of the recovered polymer measured 0.18 dL/g. The polymer had the following basic structure:

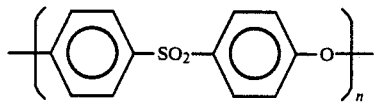

EXAMPLE 8

Into a reactor described in Example 3 was placed 4,4'-biphenol (9.30 g, 50 mmol), difluorodiphenyl sulfone (12.7125 g, 50 mmol), potassium carbonate (7.1864 g, 52 mmol) and dichlorobenzene (40 mL). The slurry was degassed by bubbling prepurified nitrogen and the nitrogen flow was maintained throughout the reaction. The reactor was placed in an oil bath and heated to reflux (185° C.) [2.2.2] cryptand (0.94 g, 2.5 mmol) was added as solution in chlorobenzene (5 mL) from an addition funnel. The addition funnel was filled with more chlorobenzene (200 mL) and was added drop by drop over a 2-hour period. The reaction was maintained above 180° C. overnight. The reaction was terminated using acetic acid in 200 mL dichlorobenzene. The resulting viscous solution was poured into a large volume of methanol in a large Waring blender at high speed. The polymer was thoroughly washed with distilled water at reflux temperature (3×500 mL) and finally with methanol (500 mL). The polymer was dried at 110° C. under 50 mm vacuum. Reduced viscosity as measured as 0.2 g in 100 mL NMP at 25° C. was 1.10. The polymer had the following structure:

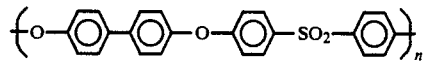

EXAMPLE 9

Example 8 was repeated by using bisphenol O (10.10 g, 50 mmol) in the place of biphenol. The reaction was conducted at 180° C. overnight. The polymer was recovered as described in Example 3. Reduced viscosity of the recovered polymer was =0.53 dL/g (0.2 g/100 mL $CHCl_3$, 25° C.). The polymer had the following basic structure:

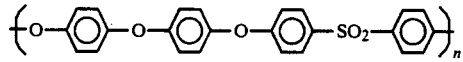

EXAMPLE 10

Example 2 was repeated with bisphenol-S (12.50 g, 50 mmol) in the place of bisphenol-A. A 20-hour reaction at 180° C. gave a polymer which has a reduced viscosity of 0.16 dL/g (0.2 g in 100 mL $CHCl_3$, 25° C.). The polymer had the following basic structure:

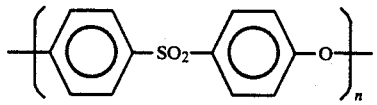

EXAMPLE 11

Example 3 was repeated with bis(4-chlorophenylsulfonyl) 4,4'-biphenyl (25.17 g. 50 mmol) in the place of dichlorodiphenyl sulfone. A 4-hour reaction at 180° C. produced a polymer which had a reduced viscosity of 0.26 dL/g (0.2 g in 100 mL $CHCl_3$, 25° C.). The polymer had the following basic structure:

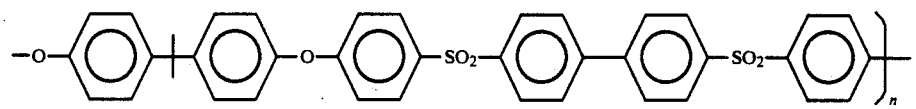

That which is claimed is:

1. A process for the preparation of poly(aryl ester) polymer resin having a basic structure comprising recurring units of the formula:

—O—E—O—E'—O— where E is the residuum of a dihydric phenol and E' is the residuum of the benzenoid compound having an inert electron-withdrawing group in at least one of the positions ortho and para to the valence bonds; both of the residua are valently bonded to ether oxygens through aromatic carbon atoms, which process comprises reacting about equimolar amounts of (I) an alkali metal double salt of dihydric phenol of the formula:

MO—E—OM' where M and M' are alkali metal ions selected from the group consisting of lithium, sodium, potassium and cesium ions with (II) a benzenoid compound of the formula:

X—E'—X' where X and X' are halogen ions independently selected from the group consisting of fluorine and chlorine ions, in the presence of a macro bicyclic compound having two nitrogen bridgehead atoms linked together by three hydrocarbon bridging chains and having in each of the hydrocarbon bridging chains at least one additional hetro atom selected from the group consisting of oxygen, nitrogen and sulfur atoms, at temperatures in a range upward from about 100° C. and below the decomposition temperatures of the polymer formed, the reactants, and the macro bicyclic compound.

2. The process according to claim 1 wherein the macro bicyclic compound is selected from the group consisting of the following formula:

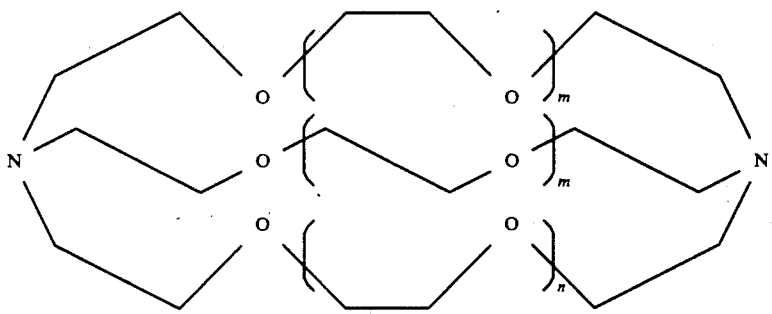

where m and n are independently numbers selected from the group consisting of 0 and 1 with the proviso that either m or n is 1.

3. The process according to claim 2 wherein the alkali metal double salt is derived from a dihydric phenol selected from the group consisting of the formula:

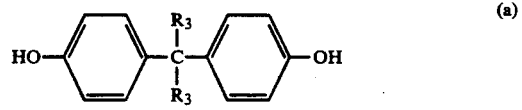
(a)

where $R_3$ represents the methyl radical,

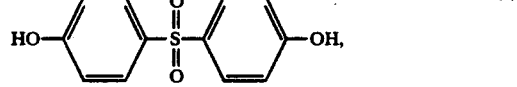
(b)

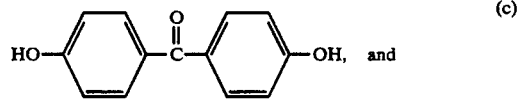
(c)

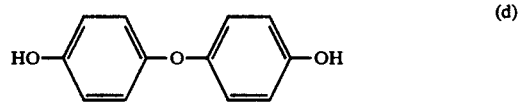
(d)

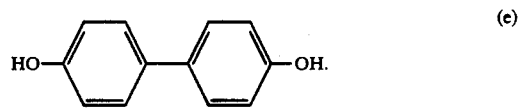
(e)

4. The process according to claim 3 wherein M and M' are lithium ions and wherein m is 0 and n is 1.

5. The process according to claim 3 wherein M and M' are sodium ions and wherein m is 1 and n is 0.

6. The process according to claim 3 wherein M and M' are potassium ions and wherein m and n are 1.

7. The process according to claim 6 wherein the benzenoid compound is 4,4'-dichlorodiphenyl sulfone.

8. The process according to claim 7 wherein the potassium salt is derived from bisphenol-A.

9. The process according to claim 2 wherein x and X' are chlorine ions.

10. The process according to claim 9 wherein M and M' are lithium ions and wherein m is 0 and n is 1.

11. The process according to claim 9 wherein M and M' are sodium ions and wherein m is 1 and n is 0.

12. The process according to claim 9 wherein M and M' are potassium ions and wherein m and n are 1.

13. The process according to claim 12 wherein the potassium salt is derived from bisphenol-A.

14. The process according to claim 13 wherein the benzenoid compound is 4,4′-dichlorodiphenyl sulfone.

15. A process for the preparation of poly(aryl ether) polymer resin having a basic structure comprising recurring units of the formula:

—O—E—O—E′—O— where E is the residuum of a dihydric phenol and E′ is the residuum of the benzenoid compound having an inert electron-withdrawing group in at least one of the positions ortho and para to the valence bonds; both of the residua are valently bonded to ether oxygens through aromatic carbon atoms, which process comprises the steps of:

(a) reacting a dihydric phenol with about a stoichiometric amount of a source of alkali metal selected from the group consisting of alkali metal hydride, hydroxide, alkoxide or alkyl compounds in the presence of an azeotrope forming solvent to form the alkali metal double salt of the dihydric phenol of the formula:

MO—E—OM′ where M and M′ are alkali metal ions selected from the group consisting of lithium, sodium, potassium and cesium ions, (b) removing water from the reacting mixture by codistillation with the azeotrope forming solvent, and (c) admixing about an equimolar amount of a benzenoid compound of the formula:

X—E′—X′

X and X′ are halogen ions independently selected from the group consisting of fluorine and chlorine ions, in the presence of a macro bicyclic compound having two nitrogen bridgehead atoms linked together by three hydrocarbon bridging chains and having in each of the hydrocarbon bridging chains at least one additional hetro atom selected from the group consisting of oxygen, nitrogen and sulfur atoms, at temperatures in a range upward from about 100° C. and below the decomposition temperatures of the polymer formed, the reactants, and the macro bicyclic compound.

16. The process according to claim 15 wherein the macrocyclic compound is selected from the group consisting of the following formula:

where m and n are independently numbers selected from the group consisting of 0 and 1 with the proviso that either m or n is 1.

17. The process according to claim 16 wherein the alkali metal double salt is derived from a dihydric phenol selected from the group consisting of the formula:

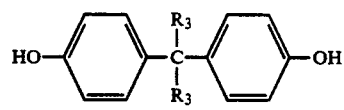
(a)

where $R_3$ represents the methyl radical,

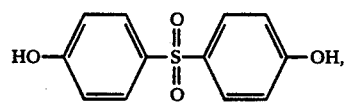
(b)

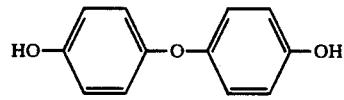
(c)

(d)

(e)

18. The process according to claim 17 wherein M and M′ are lithium ions and wherein m is 0 and n is 1.

19. The process according to claim 18 wherein X and X′ are chlorine ions.

20. The process according to claim 19 wherein the lithium salt is derived from bisphenol-A.

21. The process according to claim 20 wherein the benzenoid compound is 4,4′-dichlorodiphenyl sulfone.

22. The process according to claim 17 wherein M and M′ are sodium ions and wherein m is 1 and n is 0.

23. The process according to claim 22 wherein X and X′ are chlorine ions.

24. The process according to claim 23 wherein the sodium salt is derived from bisphenol-A.

25. The process according to claim 24 wherein the benzenoid compound is 4,4′-dichlorodiphenyl sulfone.

26. The process according to claim 17 wherein M and M′ are potassium ions and wherein m and n are 1.

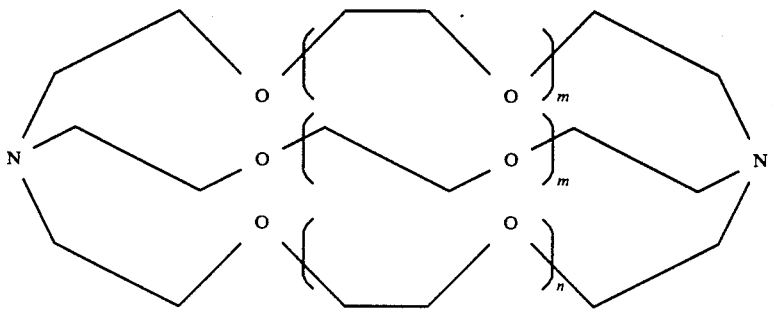

27. The process according to claim 26 wherein X and X' are chlorine ions.

28. The process according to claim 27 wherein the potassium salt is derived from bisphenol-A.

29. The process according to claim 28 wherein the benzenoid compound is 4,4'-dichlorodiphenyl sulfone.

30. The process according to claim 15 wherein M and M' are potassium ions and wherein the macro bicyclic compound is 5-decyl(2.2.2)-cryptand.

31. The process according to claim 1 wherein the macro bicyclic compound is in an immobilized form.

* * * * *